E. WEINTRAUB.
COMPOSITION OF GLASS.
APPLICATION FILED MAY 8, 1912.
1,191,630.
Patented July 18, 1916.
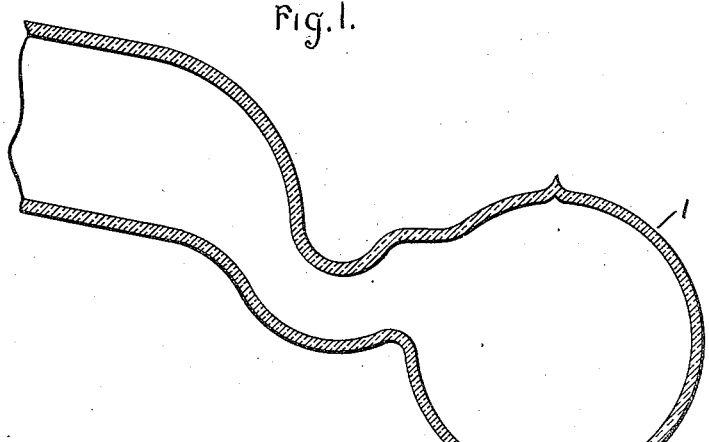
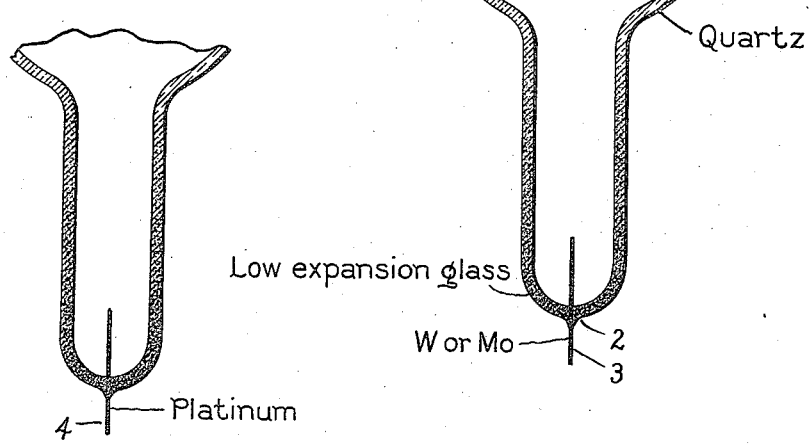

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

COMPOSITION OF GLASS.

1,191,630.  Specification of Letters Patent.  Patented July 18, 1916.

Application filed May 8, 1912. Serial No. 695,936.

*To all whom it may concern:*

Be it known that I, EZECHIEL WEINTRAUB, a citizen of the United States, residing at Lynn, county of Essex, State of Massachusetts, have invented certain new and useful Improvements in Compositions of Glass, of which the following is a specification.

The present invention relates to envelops of quartz and in particular to an improved seal between quartz and a metallic conductor.

Patent 910,969 describes a seal for quartz containers in which a metallic conductor is sealed into a glass, the composition of which merges gradually into quartz with a progressively decreasing proportion of basic constituents of the glass.

I have found when experimenting with a large number of glasses that a sodium-magnesium boro-silicate which can be obtained in the market as "low expansion glass", has the property of forming fusions with silica in any proportion with the formation of exceptionally strong tough glass for all proportions. The glasses thus produced are amorphous masses devoid of crystallization and have all the desirable properties which are characteristic of what is termed a "glass".

My invention, comprises new glasses of high melting point and low coefficient of expansion and richer in silica than any glasses produced so far, that is, in excess of about 73% silica. In view of the fact that these glasses are tough, and free from crystallization they could be used for any purposes where the above enumerated properties are desirable.

In the accompanying drawings, Figure 1 illustrates a seal in a silica envelop in which a tungsten or molybdenum wire is sealed directly into low expansion glass and Fig. 2 indicates a modification in which a platinum conductor is employed.

According to one method of carrying out my invention, low expansion glass is intimately mixed with progressively larger quantities of silica to make a series of melts. A boro-silicate suitable for this purpose has the following composition: silica, $SiO_2$, 72 to 73 per cent.; magnesium oxid, $MgO$, 3 to 4 per cent.; boric anhydrid, $B_2O_3$, 11 to 12 per cent.; sodium oxid, $Na_2O$, 12 to 13 per cent. It will be understood, of course, that this composition is illustrative. Potassium might be substituted for sodium.

A glass of the above composition or its equivalent, is very finely powdered and to separate portions ground quartz is added to the extent of about 15, 30, 50, 70 and 85% of quartz to 85, 70, 50, 30 and 15% respectively of glass. The proportions need not be strictly adhered to but are given for the purpose of illustration. These mixtures are fused to form glasses having an excess of 73% silica, as progressively larger portions of quartz are incorporated in the several portions of low expansion glass. These glassy mixtures have a coefficient of expansion intermediate between $3.5 \times 10^{-6}$, which corresponds to low expansion glass, and about $.6 \times 10^{-6}$, which corresponds to quartz. Said glasses are built up at the end of the quartz tube by means of the oxygen blowpipe or arc so as to secure a progressive change of composition from silica to low expansion glass. For example, to the end of a quartz tube 1 a ring or a layer of the vitreous mixture comprising 85% of quartz and 15% of glass is applied and heated so as to unite and intermingle it with the quartz tube. This heating causes a further blending of the two materials so that the composition changes by almost imperceptible stages from pure quartz to the material containing an appreciable amount of admixture. This process is then repeated with a vitreous material containing a lower amount of admixed silica. By working in this way the basic constituents of the boro-silicate are progressively increased when receding from the region of pure silica until finally the tube is closed with a portion 2 of low expansion glass having the above indicated composition into which a tungsten or molybdenum wire 3 is sealed in the usual manner. A low expansion, boro-silicate glass of the above composition has a coefficient of expansion of about $3.5 \times 10^{-6}$. I have found that tungsten, W, or molybdenum, Mo, which has about the same coefficient of expansion is readily wet by this glass and may be used to make a perfectly gas-tight seal as described by me in my copending application Serial No. 697,192, filed May 14, 1912, patented September 21, 1915, Patent No. 1,154,081.

In case it is desired to use a leading in wire consisting of platinum, Fig. 2, it is necessary to join by fusion to the boro-silicate other glasses having a progressively higher coefficient of expansion until the coefficient of ordinary lead glass is approached. The seal may then be completed with ordinary lead glass into which platinum wire 4 may then be inserted by fusion in the ordinary manner. Glasses having these intermediate coefficients of expansion may be readily obtained in the market. Ordinarily it is desirable to use as many as three or even more layers of glass intermediate between the boro-silicate glass and the lead glass which has a coefficient of expansion of $9 \times 10^{-6}$.

What I claim as new and desire to secure by Letters Patent of the United States, is:—

1. A tough, strong, glassy material consisting of combined basic material and the oxids of boron and silicon, the last oxid being materially in excess of 73%, said material having a thermal coefficient of expansion less than about $3.5 \times 10^{-6}$.

2. A tough, strong glass consisting of the oxid of an alkali metal, magnesium, boron and silicon, the silicon dioxid being in excess of about 73%, said glass having a thermal coefficient of expansion less than $3.5 \times 10^{-6}$.

In witness whereof, I have hereunto set my hand this sixth day of May, 1912.

EZECHIEL WEINTRAUB.

Witnesses:
   JOHN A. MCMANUS, Jr.,
   ROBERT SHAND.